US007921870B2

(12) United States Patent  
Hardie et al.

(10) Patent No.: US 7,921,870 B2  
(45) Date of Patent: Apr. 12, 2011

(54) SLURRY VALVE CLUTCH MECHANISM (75) Inventors: Nigel Hardie, Manly (AU); Michael Taylor, Scarbborough (AU); Paul Delaney, Aspley (AU)

(73) Assignee: Tyco Flow Control Pacific Pty Ltd., Nowra, NS (AU)

( * ) Notice: Subject to any disclaimer, the term of this patent is extended or adjusted under 35 U.S.C. 154(b) by 517 days.

(21) Appl. No.: 11/815,493

(22) PCT Filed: Feb. 9, 2006  
(Under 37 CFR 1.47)

(86) PCT No.: PCT/AU2006/000170  
§ 371 (c)(1),  
(2), (4) Date: Sep. 4, 2007

(87) PCT Pub. No.: WO2006/084326  
PCT Pub. Date: Aug. 17, 2006

(65) Prior Publication Data  
US 2008/0315138 A1  Dec. 25, 2008

(30) Foreign Application Priority Data  
Feb. 9, 2005  (AU) .............................. 2005900602

(51) Int. Cl.  
F16K 3/36 (2006.01)  
F16K 5/22 (2006.01)  
F16K 11/00 (2006.01)  
F16K 51/00 (2006.01)

(52) U.S. Cl. ..................... 137/243.3; 137/243.1; 251/77

(58) Field of Classification Search .............. 251/77, 251/79; 137/243, 243.1, 243.3, 243.5  
See application file for complete search history.

(56) References Cited

U.S. PATENT DOCUMENTS

| 2,192,452 | A | * | 3/1940 | Ostlind ...................... 137/243.6 |
| 4,177,825 | A | * | 12/1979 | Crawford ................... 137/243.2 |
| 4,338,961 | A | * | 7/1982 | Karpenko .................. 137/243.2 |
| 4,460,009 | A |  | 7/1984 | Nanci et al. |
| 4,465,091 | A |  | 8/1984 | Keller |
| 4,627,461 | A | * | 12/1986 | Gordon ....................... 137/243.1 |
| 7,017,882 | B2 | * | 3/2006 | Marsh et al. ..................... 251/77 |

FOREIGN PATENT DOCUMENTS

| GB | 2081844 A | 2/1982 |
| WO | 01/36853 A1 | 5/2001 |

OTHER PUBLICATIONS

PCT International Search Report for International Application No. PCT/AU2006/000170, International Filing Date Feb. 9, 2006.

* cited by examiner

Primary Examiner — John K Fristoe, Jr.

(57) ABSTRACT

A clutch mechanism for a slurry valve, wherein the slurry valve has a valve seat for seating a valve closure member carried on a valve stem, a drive member threadably engaged with the valve stem, the drive member being rotatable relative to the valve stem to axially move the valve stem and closure member relative to the valve seat to open and close the slurry valve, and a driving means for rotating the drive member, the clutch mechanism comprising: a clutch body having an internally threaded bore for threadably receiving the valve stem; and clamping means actuable with the clutch body for clamping the clutch body to the driving means so as to lock the valve stem and drive member together and allow them to rotate in unison to grind scale from the valve seat and valve closure member when they are positioned against each other.

29 Claims, 6 Drawing Sheets

SLURRY VALVE CLUTCH MECHANISM

This invention relates to an improved slurry valve, and more particularly what is known as an angle slurry valve or a Y-pattern slurry valve.

BACKGROUND OF THE INVENTION

The Lunkenheimer slurry valves are a particular brand of angle valve and Y-pattern valve. These slurry valves are used primarily in processing plants for the refining of Alumina, but have other applications where the flow of material, having abrasive components, is to be controlled. Such valves when used for the control of flow of material, but also, because of the nature of the material, are subject to the build-up of scale on the valve seat and the valve closure member within the valve. With this type of valve scale can be periodically removed without dismantling the valve.

Such valves may take a variety of forms, but all have a valve body defining an inlet port and an outlet port, a valve seat at the inlet or outlet port, a valve closure member moveable towards and away from the valve seat to open and close the valve during normal operation. This is achieved by relatively rotating an internally threaded yoke bush around a correspondingly externally threaded valve stem to achieve axial movement of the valve closure member to move it towards and away from the valve seat with either the valve stem rotating or the yoke bush rotating.

In order to remove scale from the opposing faces of the valve seat and the valve closure member, with the valve closure member positioned against the valve seat, the valve stem and the yoke bush are locked to each other. Therefore axial movement of the valve stem within the yoke bush and movement of the valve closure member away from the valve seat is prevented to allow the valve stem and yoke bush to rotate in unison to grind any scale away from the valve seat and the valve closure member.

The yoke bush carries a yoke bush handle to rotate the yoke bush thereby enabling opening and closing of the valve. In an alternative embodiment a gear mechanism engages with and rotates the yoke bush to open and close the valve. A torque reactor pin is provided which engages with an axially extending slot within the valve stem, or a collar surrounding the valve stem, in order to prevent rotation of the stem when the valve is operated by the yoke bush handle or gears. In some embodiments the valve is operated by its own valve stem handle, in which case the torque reactor pin engages the yoke bush to prevent the yoke bush from rotating.

A stem jam nut is threadably received around the valve stem above the yoke bush and is rotatable to move along the valve stem to a position against either the yoke bush handle, or the alternative gear mechanism which rotates the yoke bush, whereby the jam nut jams the yoke bush and the valve stem together such that they will rotate in unison when the valve stem is rotated by the yoke bush handle or alternatively by the valve stem handle carried by an upper end of the valve stem, or by gears where fitted. This in turn rotates the valve closure member relative to the valve seat to grind scale from both the valve seat and the valve closure member. In grinding, the yoke bush handle, valve stem handle or gear(s) are usually rotated continually in one direction but may alternatively be rotated back and forth. During this process it may be necessary to reposition the valve closure member by loosening the stem jam nut, moving the valve closure member and tightening the stem jam nut. This may be repeated several times as the build-up of scale is progressively ground away.

In order to jam or lock the valve stem and yoke bush together considerable force has to be used on the stem jam nut to rotate it firmly against either the yoke bush handle or the alternative gear mechanism, whichever is used, to allow rotation of the yoke bush relative to the valve stem. For this purpose a hammer, in the case of large valves a very large hammer is used. The necessity to use a hammer to tighten the jam nut leads to the possibility of injury to the worker as well as damage to the stem jam nut itself.

There has arisen a need to avoid the use of stem jam nuts that require the use of a hammer in order to lock (jam) the valve stem and the yoke bush together during the scale grinding operation.

SUMMARY OF THE INVENTION

In accordance with the present invention, there is provided a clutch mechanism for a slurry valve, wherein the slurry valve has a valve seat for seating a valve closure member carried on a valve stem, a drive member threadably engaged with the valve stem, the drive member being rotatable relative to the valve stem to axially move the valve stem and closure member relative to the valve seat to open and close the slurry valve, and a driving means for rotating the drive member, the clutch mechanism comprising:

a clutch body having an internally threaded bore for threadably receiving the valve stem; and clamping means actuable with the clutch body for clamping the clutch body to the driving means so as to lock the valve stem and drive member together and allow them to rotate in unison to grind scale from the valve seat and valve closure member when they are positioned against each other.

In accordance with another embodiment of the invention there is provided the pneumatic or hydraulic cylinder is provided inside the clutch body.

In accordance with yet another embodiment of the invention there is provided drive pins are provided on the clutch body in a pair of apertures on diametrically opposite sides of the bore and spaced normally from the fasteners.

BRIEF DESCRIPTION OF THE DRAWINGS

Preferred embodiments of the invention will now be described with reference to the accompanying drawings, in which.

DETAILED DESCRIPTION OF PREFERRED EMBODIMENT

The present invention is for use with slurry valves of the type having a facility for self-cleaning of valve ports by grinding closure members against ports. There are two main varieties of these type of slurry valves, namely angle slurry valves and Y-pattern slurry valves.

Figure 1:
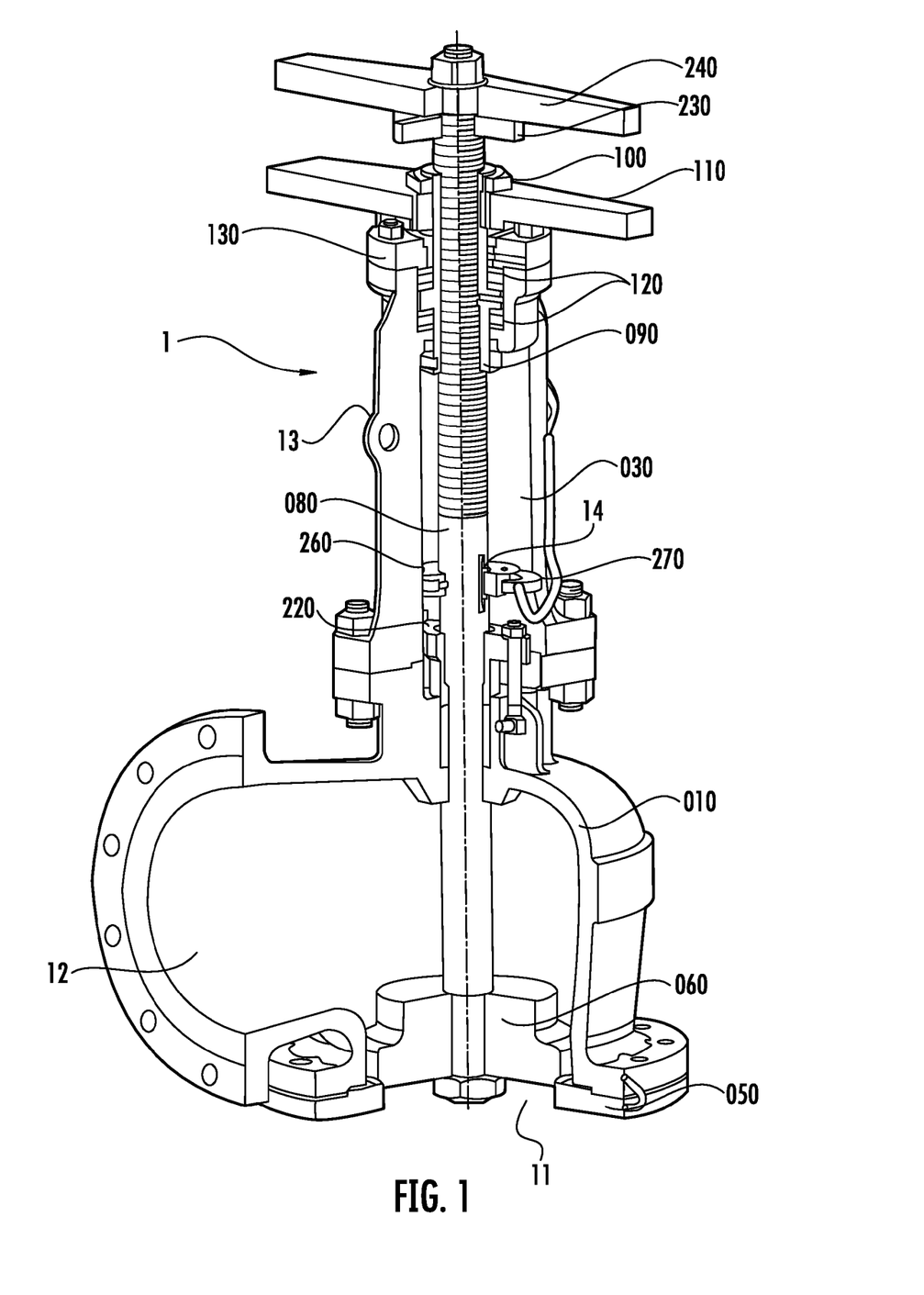
FIG. 1 is a vertical perspective, partly cross-sectioned view of one form of a conventional wrench or handle operated Lunkenheimer slurry valve.

FIG. 1 of the drawings illustrates a first conventional angle slurry valve marketed under the trade name "Lunkenheimer", generally indicated as 1, to which the clutch mechanism 40 of a preferred embodiment of the present invention relates. Slurry valve 1 comprises a valve body 010 that normally has an inlet port 11 and an outlet port 12. Under some conditions the flow may be reversed in which case the inlet port 11 and the outlet port 12 are reversed. The inlet port 11 is adapted to be opened and closed by a valve closure member or disc 060 moveable towards and away from the valve seat 050 surrounding the inlet port. The valve closure member 060 is adapted to be axially moveable toward and away from the valve seat by a valve stem 080 threadably received within a yoke bush 090 positioned with a yoke 030 and retained therein by a retaining cap 130. The yoke bush 090 is rotatable by a yoke bush handle or wrench 110 clamped to the yoke bush by a yoke bush lock nut 100. A stem jam nut 230 is rotatably threadably received around the valve stem 080 and the outer end of the valve stem may carry a stem handle or wrench 240. The valve stem 080 carries a torque reactor hub 260 having an elongate slot which receives a torque reactor pin 270.

In use, the angle slurry valve 1 illustrated in FIG. 1 can be operated to move valve closure member 060 by one of two methods. The first and usual method is to move stem jam nut 230 up against stem handle 240 and to engage torque reactor pin 270 with torque reactor hub 260 in order to lock rotation of stem 080. With yoke bush 090 free to turn, yoke bush handle 110 is rotated to thereby rotate yoke bush 090 to raise or lower stem 080 and valve closure member 060 in slurry valve body 010.

The second and alternative method is to open or close the valve by turning stem handle 240. With this method stem jam nut 230 is positioned against stem handle 240 and torque reactor pin 270 is engaged with a lower end of yoke bush 090 to prevent yoke bush 090 from rotating. Turning stem handle 240 will rotate stem 080 in yoke bush 090 and raise or lower the valve stem 080 and valve closure member 060 to open or close the slurry valve 1.

To grind closure valve member 240 against valve seat 050 in the slurry valve 1 of FIG. 1, the valve closure member 060 is firstly positioned against the seat 050 utilising the open and close procedures described above. The stem jam nut 230 is positioned against yoke bush 090 and tightened to jam the threads of the yoke bush 090 and valve stem 080 together. Torque reactor pin 270 is removed from engagement with torque reactor hub 260 or yoke bush 090. Rotation of either the yoke bush handle 110 or stem handle 240 enables valve closure member 060 to rotate against valve seat 050 without lifting away from the valve seat and without closing against the valve seat in order to remove scale from the valve seat and closure member.

Figure 2:
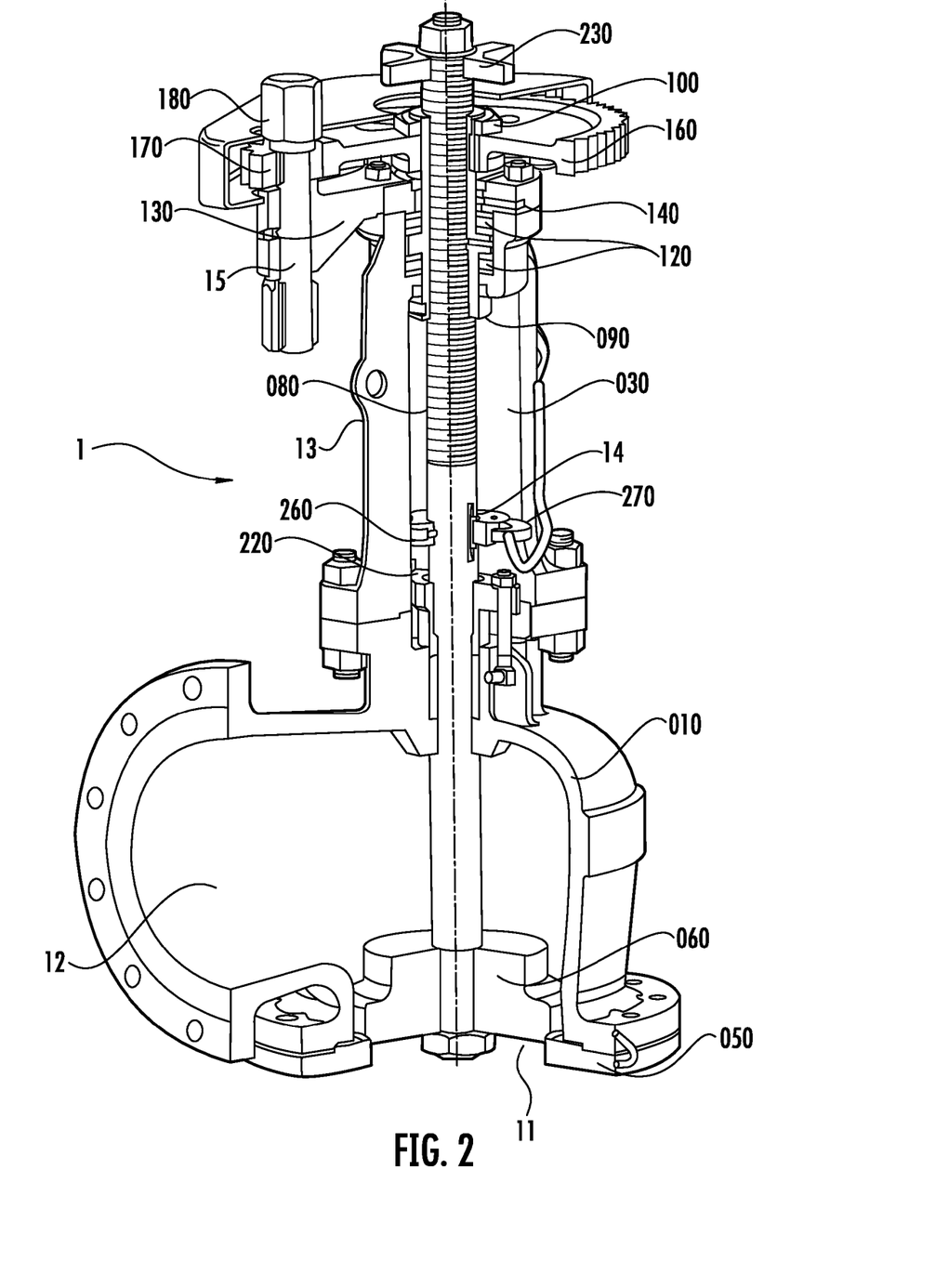
FIG. 2 is a vertical perspective, partly cross-sectioned view of another form of a conventional gear operated Lunkenheimer slurry valve.

FIG. 2 of the drawings illustrates a second conventional angle slurry valve marketed under the trade name "Lunkenheimer" to which an alternative modified form of a second preferred embodiment of the invention relates. This slurry valve is also generally indicated as 1 and comprises the same basic components of that of FIG. 1, and where applicable the same reference numerals are used. However, in this case, the yoke bush 090 is rotated by virtue of a gear train comprising a gear 160 connected to the yoke bush and rotatable by a pinion gear 170 having a pinion shaft 15 rotatable by a pinion rotating nut 180 adapted to be engaged by a wrench or by a power operated nut rotating machine, such as a nut tightening machine, but utilised to merely rotate the pinion gear rather than performing a nut tightening function.

In use, the angle slurry valve 1 illustrated in FIG. 2 operates to open or close valve closure member 060 by first engaging torque reactor pin 270 with torque reactor hub 260 to lock valve stem 080 against rotation and ensuring that stem jam nut 230 is in position at the top of the valve stem 080. Applying a torque force on pinion nut 180 rotates pinion gear 170 which in turn rotates gear 160 connected to the yoke bush 090 thereby raising or lowering valve stem 080 and valve closure member 060.

In setting the slurry valve 1 of FIG. 2 to grind, the valve closure member 060 is firstly positioned against the seat 050 utilising the open and close procedures described above. Stem jam nut 230 is positioned against the top of yoke bush 090 and tightened in order to jam the threads of yoke bush 090 and valve stem 080 so to allow them to rotate together in the same direction and thereby rotate valve closure member 060 against valve seat 050 while preventing lifting of valve closure member.

Another embodiment of an angle slurry valve (not shown) uses a bevel gear box assembly to raise and lower valve stem 080. In this embodiment there is no yoke bush but a yoke supports a bevel gear box, which comprises a pair of bevel reduction gears and a cylindrical stem nut having a central threaded bore through which the correspondingly threaded valve stem extends. The stem nut is driven to rotate by a large bevel gear co-axially connected to the stem nut. The large bevel gear is driven by a smaller bevel gear set at 90° to the large bevel gear. As the stem nut is driven to rotate, the valve stem, which is fixed against rotation by the torque reactor pin, is raised or lowered relative to the slurry housing and thereby raises and lowers the closure member against the valve seat.

Figure 3A:
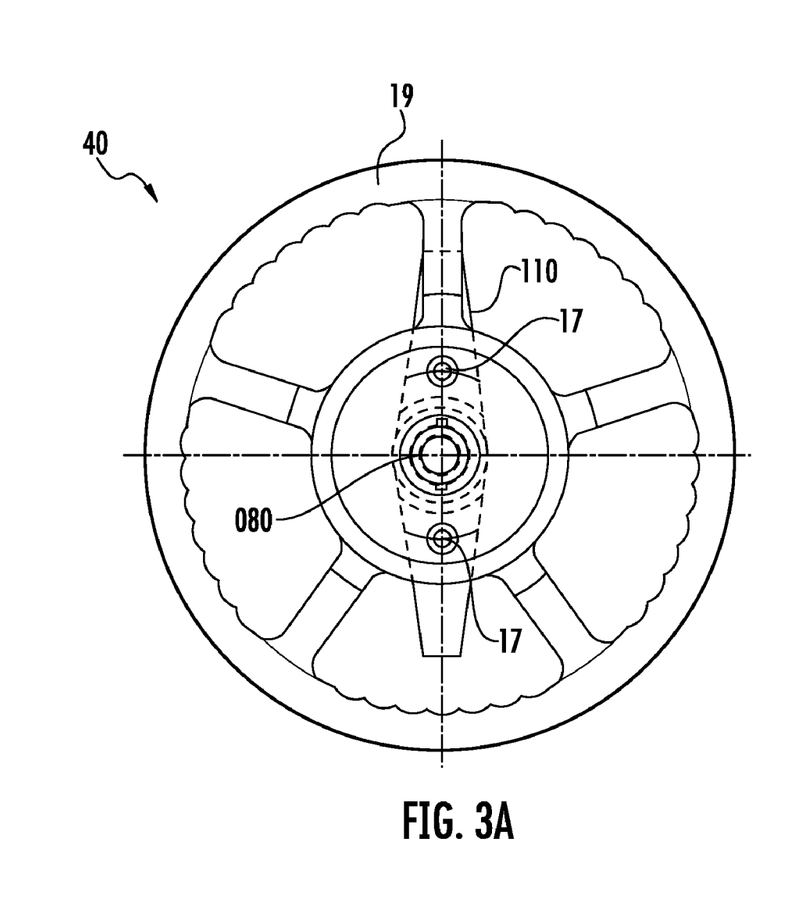
FIG. 3(a) is an end elevational view of a first embodiment of a clutch mechanism in accordance with the invention, to be incorporated in the slurry valve of FIG. 1.
Figure 3B:
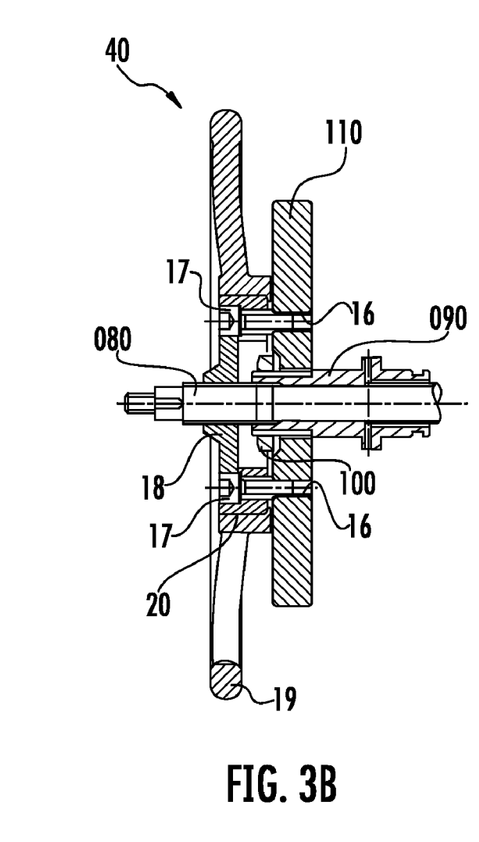
FIG. 3(b) is a cross-sectional view of the clutch mechanism of FIG. 3(a)

Turning to FIGS. 3(a) and 3(b) of the drawings, and in accordance with one preferred embodiment of the invention, the stem jam nut 230 as applied to the slurry valve of FIG. 1 of the drawings, is disposed with and replaced by a stem clutch mechanism 40. The yoke bush handle or wrench 110 which rotatably engages the yoke bush 090 has diametrically opposed threaded holes 16 adapted to receive bolts 17 through clutch mechanism 40 and specifically through a clutch core 18 to which a clutch operating hand wheel 19 is connected by a fine thread 20. Yoke bush locknut 100 maintains positioning of the yoke bush 090 on stem 080. Torque reactor pin 270 is removed from any engagement.

Upon rotation of the hand wheel 19 in a clockwise, or anticlockwise direction depending upon the style of thread, clutch core 18 moves away from the yoke bush handle 110 until the threads of the yoke bush 090 and the valve stem jam together whereby further rotation of the hand wheel causes the valve stem and the yoke bush to rotate in unison. Typically fine threads 20 are for finely adjusting the relationship of the thread of the valve stem and yoke bush and effectively clamping the valve stem and yoke bush together. Further rotation of the hand wheel consequently rotates the valve closure member 060 against the valve seat 050 without lifting the valve closure member 060 such that, when positioned against each other, built-up scale on the closure member 060 and seat 050 is ground therefrom.

Figure 3C:
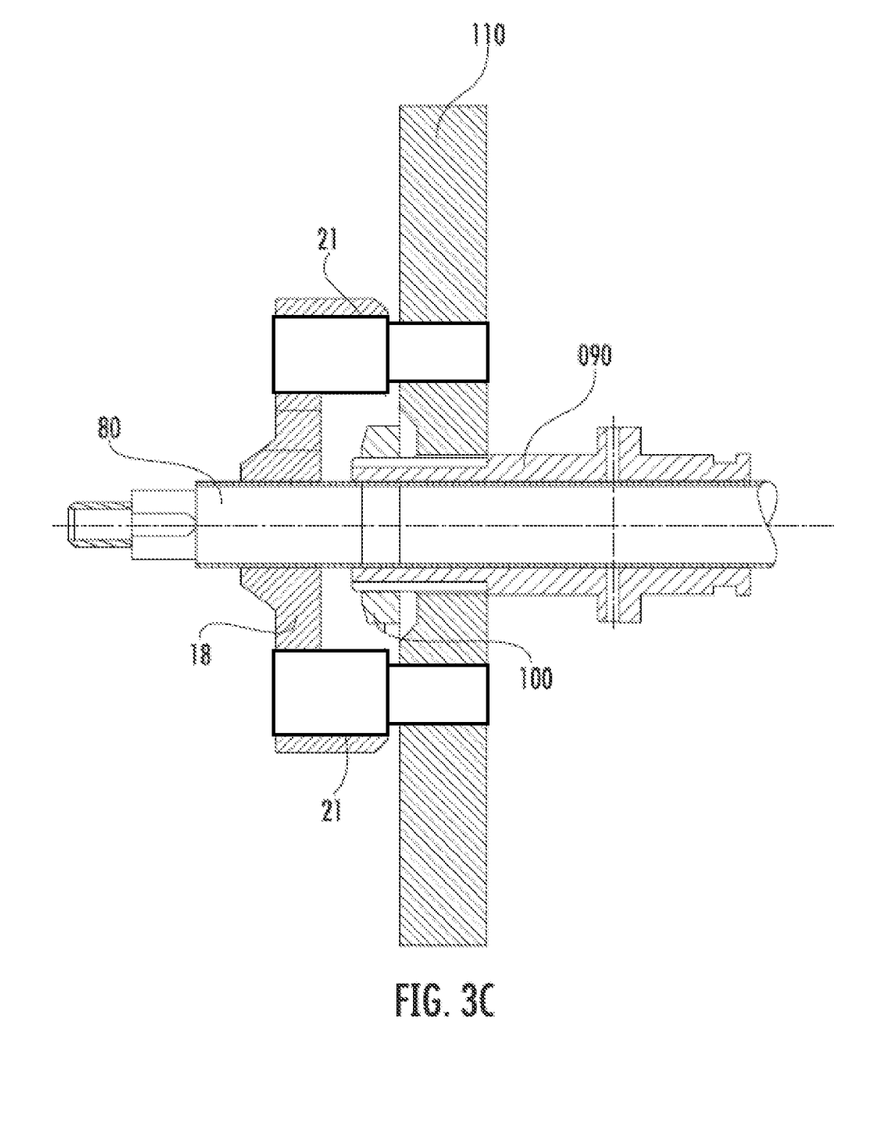
FIG. 3(c) is a cross-sectional view of the clutch mechanism of FIG. 3(a) in which the clutch hand wheel is replaced with a pneumatic or hydraulic cylinder

An alternative clamping means to the clutch operating hand wheel 19 is shown in FIG. 3(c), in which cams or hydraulic pneumatic cylinders 21 are provided to move the clutch core 18 towards or away from the yoke bush handle 110 thereby clamping the valve stem and yoke bush together. The clamping means provides a longitudinal force along the valve stem that locks or clamps the valve stem and yoke bush to rotate in unison.

Where hydraulic or pneumatic cylinders 21 are employed these are generally located inside the clutch core to force the clutch core away from the yoke bush handle. Where cams are employed these are mounted on the exterior of the clutch core. Fasteners such as stud and nuts, and bolts may also be employed as clamping means as discussed below or as further clamping means in addition to the clamping means discussed above.

Referring back to FIGS. 3(a) and 3(b), adjustment of the relative positioning of the various components including hand wheel 40 and torque reactor pin 270 may be made to progressively adjust the position of the valve closure member against the valve seat as scale is progressively removed. Bolts 17 (or pins) are fitted to ensure that the yoke bush wrench 110 and clutch core 18 always rotate in unison.

In normal use to open and close the slurry valve fitted with the clutch mechanism 40 of FIGS. 3(a) and 3(b), hand wheel 19 is rotated to free clutch core 18 from stem 080 to enable yoke bush 090 and stem 080 to rotate independently. Torque reactor pin 270 is located in torque reactor hub 260 to lock rotation of valve stem 080. Yoke bush handle 110 is then rotated to rotate yoke bush 090 thus raising or lowering valve stem 080 relative to yolk bush 090 to open and close the slurry valve.

Figure 4A:
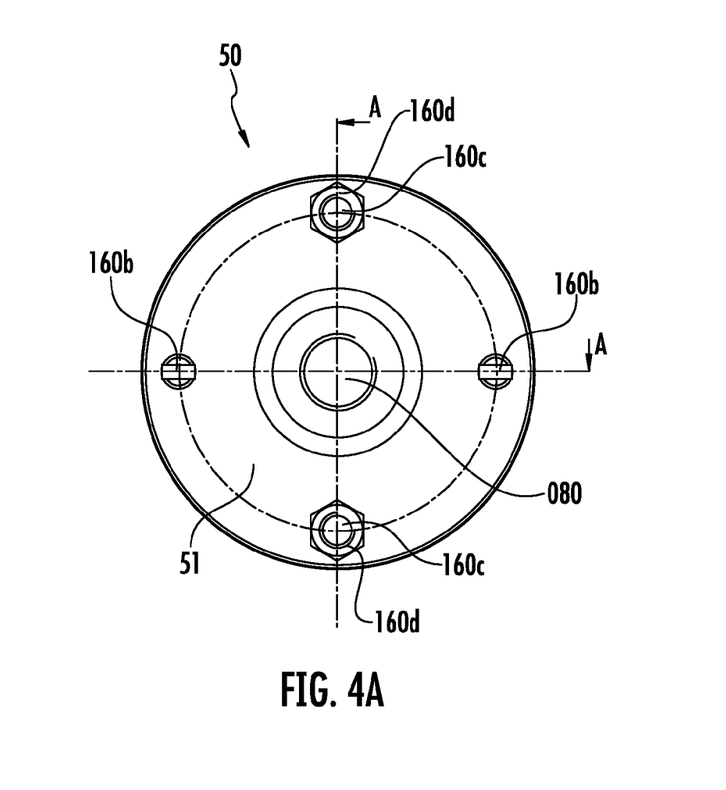
FIG. 4(a) is an end elevational view of a second embodiment of a clutch mechanism in accordance with the invention to be incorporated in the slurry valve of FIG. 2.
Figure 4B:
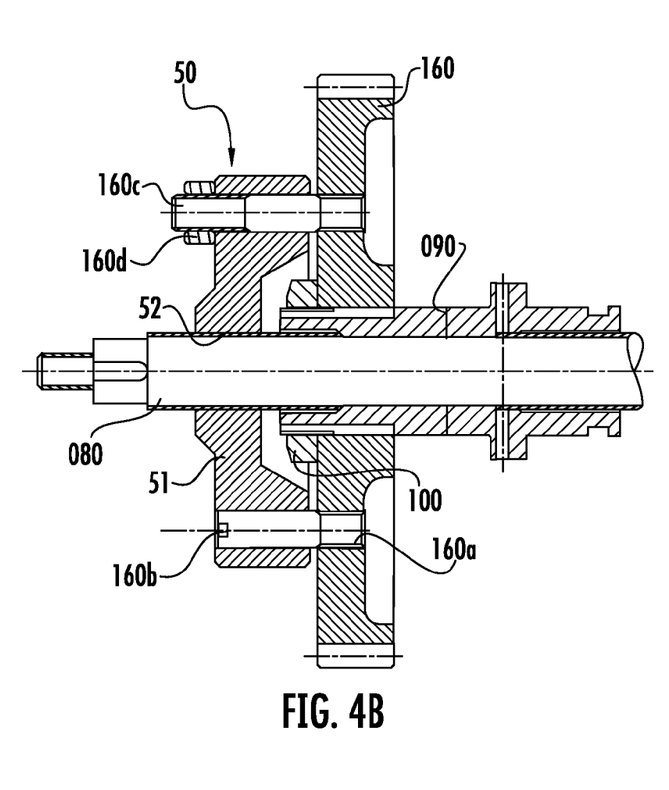
FIG. 4(b) is a cross-sectional view of the clutch mechanism of FIG. 4(a) taken at A-A and also shows a portion of the slurry valve of FIG. 2.

Turning to FIGS. 4(a) and 4(b) of the drawings, in the second preferred embodiment of the invention, the stem jam nut 230 as utilised in the slurry valve of FIG. 2 of the drawings, is again dispensed with, and replaced with a second embodiment of a stem clutch mechanism 50. The gear 160 of the gear mechanism has a pair of diametrically opposed threaded holes 160a formed therein to threadably receive a pair of drive pins 160b carried by a clutch member 51 of the clutch mechanism 50. Clutch member 51 contains an internally threaded central bore 52 which threadably locates on valve stem 080. Spaced from the drive pins are a pair or multiple pairs of also diametrically opposed operating studs 160c on which nuts 160d are threadably received. When the studs and nuts are tightened, the clutch member 51 moves longitudinally on valve stem 080 towards gear 160 and thereby locks with valve stem 080. Further rotation of gear 160 through applying a torque on pinion nut 180 will rotate the valve closure member 060 against the valve seat 050, and when positioned adjacent to each other build-up of scale is ground therefrom.

In place of the studs and nuts in the embodiments of FIGS. 4(a) and 4(b) an alternative embodiment has multiple quantities of bolts or other clamping means to provide a longitudinal force to jam the threads of the valve stem with those of the yoke bush. The other mechanisms that may be utilised to provide a longitudinal force include those described above, namely cams, pneumatic or hydraulic cylinders or annular hand wheels provided with fine threads.

Once again the valve stem of FIGS. 4(a) and 4(b) is adjusted by releasing clutch engagement, and engaging torque reactor pin 270 with torque reactor hub 260 and moving valve stem 080 down to adjust the relative positioning of the valve closure member against the valve seat as scale is progressively removed. Torque reactor pin 270 is then disengaged, studs 160c and nuts 160d are tightened and valve stem and yoke bush are rotated again in unison to grind scale from the closure member 060 and valve seat 050.

In normal opening and closing of the slurry valve modified with the stem clutch mechanism 50, the clutch mechanism 50, still loosely attached to the gear 160, rotates on valve stem 080 as the valve stem is raised and lowered.

Figure 5A:
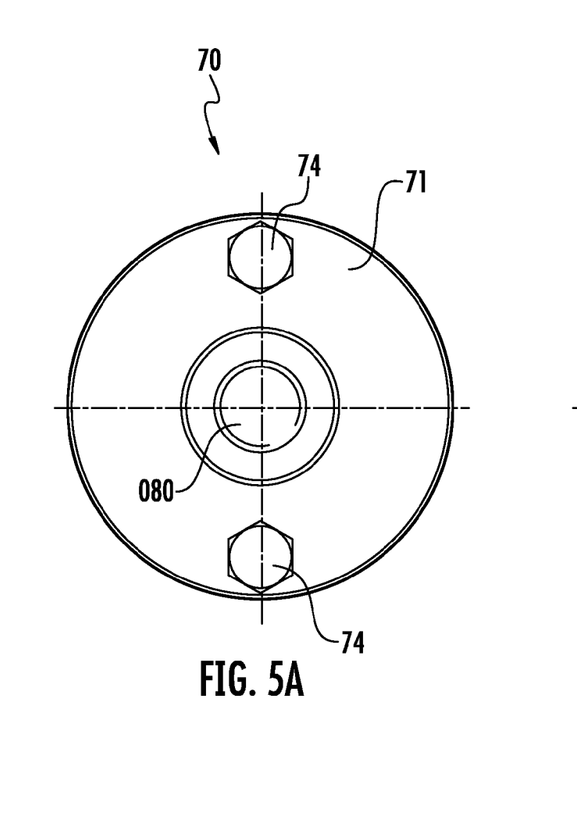
FIG. 5(a) is an end elevational view of a third embodiment of a clutch mechanism in accordance with the invention to be incorporated in a conventional bevel gear operated Lunkenheimer slurry valve.
Figure 5B:
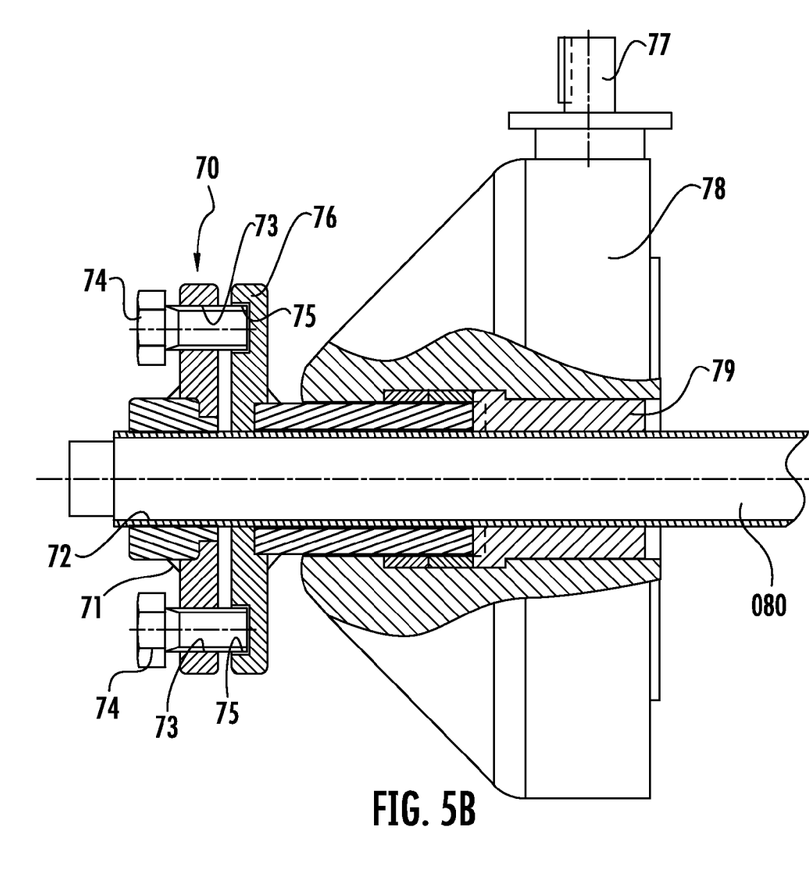
FIG. 5(b) is a part cross-sectional view of the clutch mechanism of FIG. 5(a) and also shows a portion of a conventional bevel gear operated Lunkenheimer slurry valve.

FIGS. 5(a) and 5(b) illustrate a portion of the bevel gearbox discussed earlier and to which a third embodiment of a clutch mechanism 70 can be installed. The slurry valve to which the clutch mechanism 70 is installed operates in a similar manner to the slurry valve illustrated in FIG. 2 but rather than a straight gear train the slurry valve operates using a bevel gearbox assembly 78.

The principle of clutch mechanism 70 illustrated in FIGS. 5(a) and 5(b) is similar to that of clutch mechanisms 40 and 50 of the previously described embodiments in that the clutch mechanism 70 is adapted to lock or jam together the valve stem 080 and the stem nut 79. The bevel gearbox which supports the stem nut 79 is not illustrated in the slurry valve of FIG. 5(b). Clutch mechanism 70 comprises a clutch plate 71 having an internally threaded bore 72 adapted to be mounted on valve stem 080. One or multiple sets of diametrically opposed apertures 73 in clutch plate 71 are provided with set screws 74 which extend through apertures 73 and into corresponding recesses 75 in gear extension plate 76. Gear extension plate 76 is fixed to and driven by the bevel gearbox stem nut 79 via large and small bevel gear from input drive shaft 77. Contrary to clutch mechanisms 50, set screws 74 in clutch mechanism 70 are tightened to separate clutch plate 71 and gear extension plate 76 thereby jamming the threads of valve stem 080 against the threads of the stem nut 79. As discussed previously, variations of the design may involve multiple sets of bolts and studs or other clamping mechanisms to provide a longitudinal force between the two threaded portions on the clutch mechanism in order to lock the stem 080 to the stem nut 79.

Once again, relative adjustment of the positioning of valve closure member 060 may be required to move the valve closure member closer to valve seat 050 as scale is progressively removed.

When grinding scale in all of the above embodiments valve closure member 060 is not overly tightened on valve seat 050 but left with some play therebetween in order to allow the valve closure member to rotate against the valve seat and grind away scale.

The present embodiments of the clutch mechanisms may be retrofitted onto existing slurry valves requiring only apertures to be drilled in the yoke bush handle or gears to allow for attachment of the clutch mechanism. Incorporation of the clutch mechanism for grinding a slurry valve means that much less force is required to jam the yoke bush and valve stem thereby making it easier and less dangerous for operators to grind the valves. More importantly, use of a hammer is no longer required where the above clutch mechanisms are fitted to slurry valves. The clutch mechanisms are not intrusive and do not interfere with the normal opening and closing operation of the slurry valve. Furthermore, the clutch mechanisms are easily retrofitted to existing slurry valves requiring only minor modification to the slurry valves.

Since modifications within the spirit and scope of the invention may readily be effected by persons skilled within the art, it is to be understood that this invention is not limited to the particular embodiment described by way of example hereinabove.

The claims defining the invention are as follows:

1. A clutch mechanism for a slurry valve, wherein the slurry valve has a valve seat for seating a valve closure member carried on a valve stem, a drive member threadably engaged with the valve stem, the drive member being rotatable relative to the valve stem to axially move the valve stem and closure member relative to the valve seat to open and close the slurry valve, and a driving means for rotating the drive member, the clutch mechanism comprising:
   a clutch body having an internally threaded bore for threadably receiving the valve stem; and
   clamping means actuable with the clutch body for clamping the clutch body to the driving means so as to lock the valve stem and drive member together and allow them to rotate in unison to grind scale from the valve seat and valve closure member when they are positioned against each other;
   wherein when the valve stem and drive member are locked together, all further rotation of the valve stem handle rotates the valve closure member against the valve seat without lifting away from the valve seat and without closing against the valve seat.

2. The clutch mechanism claimed in claim 1, wherein the bore is located centrally of the clutch body.

3. The clutch mechanism claimed in claim 1, wherein the clamping means is fasteners positioned in a pair of apertures in the clutch body located on diametrically opposite sides of the bore.

4. The clutch mechanism claimed in claim 3, wherein the fasteners are studs and nuts, or bolts.

5. The clutch mechanism claimed in claim 3, wherein drive pins are provided on the clutch body in a pair of apertures on diametrically opposite sides of the bore and spaced normally from the fasteners.

6. The clutch mechanism claimed in claim 1, wherein the clamping means is an annular wheel located around the periphery of the clutch body and engages with the clutch body by a fine external thread.

7. The clutch mechanism claimed in claim 1, wherein the clamping means is a pneumatic or hydraulic cylinder that produces a longitudinal force on the clutch body relative to the driving means.

8. The clutch mechanism claimed in claim 7, wherein the pneumatic or hydraulic cylinder is provided inside the clutch body.

9. The clutch mechanism claimed in claim 1, wherein the clamping means is a cam arrangement engagable with the exterior of the clutch body.

10. The clutch mechanism claimed in claim 1, wherein the clutch body is annular.

11. A slurry valve comprising a valve body having an inlet and an outlet, one of which has a valve seat for seating a valve closure member carried on a valve stem;
   a drive member threadably engaged with the valve stem and rotatable relative to the valve stem to axially move the valve stem and closure member relative to the valve seat to open and close the inlet or outlet;
   a driving means for rotating the drive member; a clutch mechanism having a clutch body with an internally threaded bore for threadably receiving the valve stem; and
   clamping means actuable with the clutch body for clamping the clutch body to the driving means so as to lock the valve stem and drive member together and allow them to rotate in unison to grind scale from the valve seat and closure member when they are positioned against each other;
   wherein when the valve stem and drive member are locked together, all further rotation of the valve stem handle rotates the valve closure member against the valve seat without lifting away from the valve seat and without closing against the valve seat.

12. The slurry valve claimed in claim 11, wherein the fasteners positioned in apertures located on diametrically opposite sides of the bore, the fasteners being received in recesses in the driving means.

13. The slurry valve claimed in claim 12, wherein the fasteners are studs and nuts, or bolts.

14. The slurry valve claimed in claim 12, wherein drive pins are provided on the clutch body in a pair of apertures on diametrically opposite sides of the bore and spaced normally from the fasteners.

15. The slurry valve claimed in claim 11, wherein the clamping means is an annular wheel located around the periphery of the clutch body and engages with the clutch body by a fine external thread.

16. The slurry valve claimed in claim 11, wherein the clamping means is a pneumatic or hydraulic cylinder that produces a longitudinal force on the clutch body relative to the driving means.

17. The slurry valve claimed in claim 16, wherein the pneumatic or hydraulic cylinder is provided inside the clutch body.

18. The slurry valve claimed in claim 11, wherein the clamping means is a cam arrangement engagable with the exterior of the clutch body.

19. The slurry valve claimed in claim 11, wherein the driving means is a yoke bush handle.

20. The slurry valve claimed in claim 11, wherein the driving means is a gear assembly.

21. The clutch mechanism claimed in claim 11, wherein the drive member is a yoke bush or a stem nut, wherein the yoke bush or stem nut is held in a yoke in the valve body.

22. A method of grinding a valve closure member against a valve seat in a slurry valve including:
   clamping a clutch mechanism threadably provided on a valve stem to driving means by way of a clamping means to lock together the valve stem and drive member, the valve stem carrying the valve closure member, wherein in normal valve use the driving means drives a drive member threadably engaged with the valve stem and rotatable relative to the valve stem to axially move the valve stem relative to the valve seat to open and close the slurry valve;
   applying a torque to the clutch mechanism or the driving means so to rotate the valve stem and drive member in unison thereby grinding the valve closure member with the valve seat when they are positioned against each other;
   wherein when the valve stem and drive member are locked together, all further rotation of the valve stem handle rotates the valve closure member against the valve seat without lifting away from the valve seat and without closing against the valve seat.

23. The method claimed in claim 22, including engaging a torque reactor pin to prevent the stem valve from rotating, releasing the clamping means;

axially moving the valve stem to move the valve closure member closer to the valve seat; and re-engaging the clamping means, disengaging the torque reactor pin and applying a torque to the clutch mechanism or driving means to further grind the valve closure member against the valve seat.

24. A clutch mechanism for a slurry valve, wherein the slurry valve has a valve seat for seating a valve closure member carried on a valve stem, a drive member threadably engaged with the valve stem, the drive member being rotatable relative to the valve stem to axially move the valve stem and closure member relative to the valve seat to open and close the slurry valve, and a driving means for rotating the drive member, the clutch mechanism comprising:
- a clutch body having an internally threaded bore for threadably receiving the valve stem; and
- clamping means actuable with the clutch body for clamping the clutch body to the driving means so as to lock the valve stem and drive member together and allow them to rotate in unison to grind scale from the valve seat and valve closure member when they are positioned against each other;
- wherein the clamping means is fasteners positioned in a pair of apertures in the clutch body located on diametrically opposite sides of the bore.

25. A clutch mechanism for a slurry valve, wherein the slurry valve has a valve seat for seating a valve closure member carried on a valve stem, a drive member threadably engaged with the valve stem, the drive member being rotatable relative to the valve stem to axially move the valve stem and closure member relative to the valve seat to open and close the slurry valve, and a driving means for rotating the drive member, the clutch mechanism comprising:
- a clutch body having an internally threaded bore for threadably receiving the valve stem; and
- clamping means actuable with the clutch body for clamping the clutch body to the driving means so as to lock the valve stem and drive member together and allow them to rotate in unison to grind scale from the valve seat and valve closure member when they are positioned against each other;
- wherein the clamping means is an annular wheel located around the periphery of the clutch body and engages with the clutch body by a fine external thread.

26. A clutch mechanism for a slurry valve, wherein the slurry valve has a valve seat for seating a valve closure member carried on a valve stem, a drive member threadably engaged with the valve stem, the drive member being rotatable relative to the valve stem to axially move the valve stem and closure member relative to the valve seat to open and close the slurry valve, and a driving means for rotating the drive member, the clutch mechanism comprising:
- a clutch body having an internally threaded bore for threadably receiving the valve stem; and
- clamping means actuable with the clutch body for clamping the clutch body to the driving means so as to lock the valve stem and drive member together and allow them to rotate in unison to grind scale from the valve seat and valve closure member when they are positioned against each other;
- wherein the clamping means is a pneumatic or hydraulic cylinder that produces a longitudinal force on the clutch body relative to the driving means.

27. A slurry valve comprising a valve body having an inlet and an outlet, one of which has a valve seat for seating a valve closure member carried on a valve stem;
- a drive member threadably engaged with the valve stem and rotatable relative to the valve stem to axially move the valve stem and closure member relative to the valve seat to open and close the inlet or outlet;
- a driving means for rotating the drive member; a clutch mechanism having a clutch body with an internally threaded bore for threadably receiving the valve stem; andclamping means actuable with the clutch body for clamping the clutch body to the driving means so as to lock the valve stem and drive member together and allow them to rotate in unison to grind scale from the valve seat and closure member when they are positioned against each other;
- wherein the fasteners positioned in apertures located on diametrically opposite sides of the bore, the fasteners being received in recesses in the driving means.

28. A slurry valve comprising a valve body having an inlet and an outlet, one of which has a valve seat for seating a valve closure member carried on a valve stem;
- a drive member threadably engaged with the valve stem and rotatable relative to the valve stem to axially move the valve stem and closure member relative to the valve seat to open and close the inlet or outlet;
- a driving means for rotating the drive member; a clutch mechanism having a clutch body with an internally threaded bore for threadably receiving the valve stem; and
- clamping means actuable with the clutch body for clamping the clutch body to the driving means so as to lock the valve stem and drive member together and allow them to rotate in unison to grind scale from the valve seat and closure member when they are positioned against each other;
- wherein the clamping means is an annular wheel located around the periphery of the clutch body and engages with the clutch body by a fine external thread.

29. A slurry valve comprising a valve body having an inlet and an outlet, one of which has a valve seat for seating a valve closure member carried on a valve stem;
- a drive member threadably engaged with the valve stem and rotatable relative to the valve stem to axially move the valve stem and closure member relative to the valve seat to open and close the inlet or outlet;
- a driving means for rotating the drive member; a clutch mechanism having a clutch body with an internally threaded bore for threadably receiving the valve stem; andclamping means actuable with the clutch body for clamping the clutch body to the driving means so as to lock the valve stem and drive member together and allow them to rotate in unison to grind scale from the valve seat and closure member when they are positioned against each other;
- wherein the clamping means is a pneumatic or hydraulic cylinder that produces a longitudinal force on the clutch body relative to the driving means.

* * * * *